United States Patent
Hatori et al.

(10) Patent No.: US 9,803,115 B2
(45) Date of Patent: Oct. 31, 2017

(54) ADHESIVE HYDROGEL AND METHOD FOR ELECTROLYTIC PROTECTION OF CONCRETE STRUCTURE

(71) Applicant: Sekisui Plastics Co., Ltd., Osaka-shi (JP)

(72) Inventors: Takaaki Hatori, Tenri (JP); Kaori Sato, Tenri (JP); Takahiko Fujita, Inasiki-gun (JP); Kengo Nakamura, Inasiki-gun (JP)

(73) Assignee: Sekisui Plastics Co., Ltd., Osaka-Shi (JP)

(*) Notice: Subject to any disclaimer, the term of this patent is extended or adjusted under 35 U.S.C. 154(b) by 262 days.

(21) Appl. No.: 14/378,468

(22) PCT Filed: Sep. 28, 2012

(86) PCT No.: PCT/JP2012/075132
§ 371 (c)(1),
(2) Date: Aug. 13, 2014

(87) PCT Pub. No.: WO2013/140646
PCT Pub. Date: Sep. 26, 2013

(65) Prior Publication Data
US 2015/0021201 A1    Jan. 22, 2015

(30) Foreign Application Priority Data

Mar. 22, 2012  (JP) .................... 2012-065723

(51) Int. Cl.
| | |
|---|---|
| C09J 9/02 | (2006.01) |
| C09J 133/26 | (2006.01) |
| C08L 33/26 | (2006.01) |
| C23F 13/06 | (2006.01) |
| C09J 133/24 | (2006.01) |
| C23F 13/00 | (2006.01) |
| C08K 5/00 | (2006.01) |

(52) U.S. Cl.
CPC .............. *C09J 133/26* (2013.01); *C09J 9/02* (2013.01); *C09J 133/24* (2013.01); *C23F 13/00* (2013.01); *C23F 13/06* (2013.01); *C08K 5/0025* (2013.01); *C08L 33/26* (2013.01); *C08L 2312/00* (2013.01); *C23F 2201/02* (2013.01); *C23F 2213/22* (2013.01)

(58) Field of Classification Search
CPC . C09J 133/26; C09J 9/02; C23F 13/00; C23F 13/06; C23F 2201/02; C23F 2213/22; C08L 33/26
USPC ......................... 524/377, 386, 388
See application file for complete search history.

(56) References Cited

U.S. PATENT DOCUMENTS

| | | | | |
|---|---|---|---|---|
| 5,270,358 A | * | 12/1993 | Asmus | A61L 24/043 424/448 |
| 5,437,902 A | * | 8/1995 | Itoh | B32B 17/10036 428/192 |
| 5,650,060 A | | 7/1997 | Huang et al. | |
| 2004/0191316 A1 | * | 9/2004 | Sasahara | A61K 9/0009 424/486 |
| 2009/0183998 A1 | | 7/2009 | Bennett | |
| 2010/0038261 A1 | * | 2/2010 | Bennett | C23F 13/02 205/766 |
| 2013/0289157 A1 | | 10/2013 | Sato et al. | |
| 2014/0296418 A1 | | 10/2014 | Sato et al. | |

FOREIGN PATENT DOCUMENTS

| | | |
|---|---|---|
| EP | 1437380 A1 | 7/2004 |
| EP | 2799507 A1 | 11/2014 |
| JP | 62-267485 A | 11/1987 |
| JP | 09-508439 A | 8/1997 |
| JP | 09-243581 A | 9/1997 |
| JP | 2001-049472 A | 2/2001 |
| JP | 2001-131250 A | 5/2001 |
| JP | 2002-301443 A | 10/2002 |
| JP | 2006-160861 A | 6/2006 |
| JP | 2007-112972 A | 5/2007 |
| JP | 3944335 B2 | 7/2007 |
| JP | 2008-057015 A | 3/2008 |
| JP | 2008-127678 A | 6/2008 |
| WO | WO-2008/118589 A1 | 10/2008 |

OTHER PUBLICATIONS

Supplementary European Search Report dated Sep. 28, 2015, issued for the European patent application No. 12 87 1873.1.
International Search Report dated Nov. 6, 2012, issued for PCT/JP2012/075132.

* cited by examiner

*Primary Examiner* — Roberto Rabago
(74) *Attorney, Agent, or Firm* — Locke Lord LLP; James E. Armstrong, IV; Nicholas J. DiCeglie, Jr.

(57) ABSTRACT

Disclosed is an adhesive hydrogel containing a polymer matrix, water, and a polyhydric alcohol, wherein the polymer matrix contains a copolymer of a monofunctional monomer with a single polymerizable C—C double bond and a polyfunctional monomer with two or more polymerizable C—C double bonds, the monofunctional monomer contains a nonionic (meth)acrylamide-based monomer, and the polyfunctional monomer has a composition formula: $C_lH_mO_n$, where O is an oxygen atom in an ether bond, l is an integer greater than or equal to 4, m is an integer greater than or equal to 6, and n is an integer greater than or equal to 0.

9 Claims, No Drawings

ADHESIVE HYDROGEL AND METHOD FOR ELECTROLYTIC PROTECTION OF CONCRETE STRUCTURE

TECHNICAL FIELD

The present invention relates to adhesive hydrogels that exhibit excellent resistance to liquefaction and swelling under alkaline conditions, possess sufficient adhesive strength for concrete and metal over time, and when used in a method for electrolytic protection of a concrete structure, ensure stable electrical conductivity over time. The present invention also relates to methods for electrolytic protection of concrete structures using such an adhesive hydrogel.

BACKGROUND ART

Concrete structures reinforced with iron or fiber rods or other reinforcing materials (hereinafter, "concrete structures") are used in an extremely wide range of applications, especially in the fields of civil engineering and construction, because of their excellent mechanical strength and durability and low cost. They are used, for example, for bridge footing for highways and railways; tunnels; pillars, beams, and walls for architectural structures; and concrete precast products such as Hume concrete pipes and manholes.

In these concrete structures, steel materials such as iron rods corrode if oxygen, water, or chloride ion seeps inside. Corrosion products, formed by corrosion of such a steel material, expand in volume and cause cracks in the concrete structure, which accelerates the corrosion of the steel material. The steel material could decrease in cross-section, degrading the strength and other physical properties of the concrete structure. Thus, various methods have been developed to prevent the corrosion of steel materials for minimum maintenance in view of extended lifetime and/or life cycle cost of the concrete structure. Electrolytic protection is a method that prevents corrosion of steel materials in the concrete structure.

Electrolytic protection can be classified into impressed current systems and galvanic anode systems. An impressed current system operates on a DC power source to pass a protection current between an auxiliary electrode as an anode and a target object as a cathode (since the protection current is a direct current, the method requires a DC power source). Meanwhile, a galvanic anode system uses an electrochemically active metal (target object, generally a steel material in a concrete structure) as a cathode and an electrochemically active sacrificial metal (zinc, aluminum, or alloy of these metals) having a higher dissolution potential than the cathode as an anode in order to generate a potential difference between the cathode and the anode so that a protection current is provided.

In these methods for electrolytic protection, a sheet- or panel-shaped anode may be disposed on the surface of the concrete structure. When this is the case, an electrically conductive water retention material (backfill) is provided between the surface of the concrete structure and the anode to fill a gap at the interface to lower electrical resistance.

The electrically conductive water retention material (backfill) is preferably a gel so that it can follow rough surface of a porous material such as the concrete structure. Examples of such a water retention material (backfill) in gel form include the adhesive hydrogel of Patent Document 1 to which an electrolyte is added, the electrically conductive, non-electrolyte-based polymer gel of Patent Document 2, the backfill of Patent Documents 3 and 4 for use in electrolytic protection, and the ionically conductive medium of Patent Document 5.

These exemplary electrically conductive water retention materials in gel form are used in electrolytic protection and may also be used, for example, as a material for a non-polarized electrode installed on the surface of the ground or bedrock in an electric geological survey (see, for example, Patent Document 2) and as an electrically conductive material, for example, in detection of damage of a waterproof sheet in a waste disposal site (see, for example, Patent Documents 6 and 7).

The adhesive hydrogel of Patent Document 1 is a hydrogel containing a polymer matrix of a copolymer of a nonionic polymerizable monomer and a crosslinking monomer, water, a humectant, and a copolymer of acrylic acid and methacrylic acid. The adhesive hydrogel, due to its adhesiveness, is suited for use as a general pressure sensitive adhesive material even when no electrical conductivity is imparted to it.

CITATION LIST

Patent Literature

Patent Document 1: Japanese Patent Application Publication, Tokukai, No. 2007-112972
Patent Document 2: Japanese Patent No. 3944335
Patent Document 3: Japanese Patent Application Publication, Tokukai, No. 2008-127678
Patent Document 4: Japanese Patent Application Publication, Tokukai, No. 2008-57015
Patent Document 5: Published Japanese Translation of PCT Application, Tokuhyohei, No. 9-508439
Patent Document 6: Japanese Patent Application Publication, Tokukaihei, No. 9-243581
Patent Document 7: Japanese Patent Application Publication, Tokukai, No. 2002-301443

SUMMARY OF THE INVENTION

Problems to be Solved by the Invention

The adhesive hydrogel of Patent Document 1 is useable primarily as an ingredient of biological electrodes and tapes and suited for use on the human skin under neutral to weak acidic conditions. The adhesive hydrogel of Patent Document 1 is not suited for use under alkaline conditions, for example, as a pressure sensitive adhesive material for concrete and like alkaline substances. Specifically, the adhesive hydrogel of Patent Document 1 is obtained using primarily a polyfunctional monomer with amide bonds and ester bonds as the aforementioned crosslinking monomer. Therefore, under alkaline conditions, the amide and ester bonds in the crosslinked structure are hydrolyzed, which disintegrates the three-dimensional network (crosslinked structure of the polymer matrix) and causes liquefaction of the adhesive hydrogel. Consequently, the adhesive hydrogel of Patent Document 1 does not ensure sufficient adhesive strength for concrete and like alkaline substances over time. If the adhesive hydrogel of Patent Document 3 is used as the aforementioned water retention material (backfill) in electrolytic protection of a concrete structure, the adhesive hydrogel could come off the surface of the concrete structure, which would increase electrical resistance near the anode over time and hinder protection current.

The non-electrolyte-based polymer gel of Patent Document 2, similarly to the adhesive hydrogel of Patent Document 1, is obtained using a crosslinking monomer with amide bonds and ester bonds and subject to liquefaction under alkaline conditions. The polymer gel of Patent Document 2 therefore does not ensure sufficient adhesive strength over time. Hence, if the non-electrolyte-based polymer gel of Patent Document 2 is used as the aforementioned water retention material (backfill) in electrolytic protection of a concrete structure, the non-electrolyte-based polymer gel could come off the surface of the concrete structure, which would increase electrical resistance near the anode over time and hinder protection current.

The electrolytic protection backfill of Patent Document 3 contains a water absorbing resin and an alkaline aqueous solution. Since the backfill is not adhesive, the backfill is not capable of attaching the anode to the surface of the concrete structure.

The electrolytic protection backfill of Patent Document 4 contains a water-soluble polymer. If external water seeps into the backfill via which the anode is disposed on the surface of the concrete structure, the backfill could swell excessively, gain weight, and fall out.

The ionically conductive medium of Patent Document 5 primarily contains a hydrogel that contains, for example, a poly(acrylamide-2-methylpropanesulfonic acid), a salt thereof, and an N-vinylpyrrolidone/acrylic copolymer. This hydrogel does not ensure sufficient adhesive strength under alkaline conditions over time. If the ionically conductive medium of Patent Document 5 is used in electrolytic protection of a concrete structure, the ionically conductive medium could come off the surface of the concrete structure, which would increase electrical resistance near the anode over time and hinder protection current. The hydrogel in the ionically conductive medium has another problem that it may form a non-electrically conductive passivation layer between itself and the anode, which in turn prohibits a continuous flow of a protection current. To prevent the formation of a passivation layer, a complexing agent is added to the ionically conductive medium of Patent Document 5. It is however difficult to completely prevent the formation of a passivation layer by adding a complexing agent. The addition of a complexing agent is also a contributing factor for high cost.

The present invention, conceived in view of these problems, has an object to provide an adhesive hydrogel that exhibits excellent resistance to liquefaction and swelling under alkaline conditions, possesses sufficient adhesive strength for concrete and metal over time, and when used in a method for electrolytic protection of a concrete structure, ensures stable electrical conductivity over time and also to provide a method for electrolytic protection of a concrete structure using such an adhesive hydrogel.

Solution to Problem

An adhesive hydrogel in accordance with the present invention, to solve the problems, contains a polymer matrix, water, and a polyhydric alcohol, the polymer matrix containing a copolymer of a monofunctional monomer with a single polymerizable C—C double bond and a polyfunctional monomer with two or more polymerizable C—C double bonds, the monofunctional monomer containing a nonionic (meth)acrylamide-based monomer, and the polyfunctional monomer having a composition formula: $C_lH_mO_n$, where O is an oxygen atom in an ether bond, l is an integer greater than or equal to 4, m is an integer greater than or equal to 6, and n is an integer greater than or equal to 0.

In the adhesive hydrogel, a monomer that has a composition formula of $C_lH_mO_n$, where O is an oxygen atom in an ether bond, l is an integer greater than or equal to 4, m is an integer greater than or equal to 6, and n is an integer greater than or equal to 0, that is, a monomer with no hydrolyzable moieties under alkaline conditions, such as ester bonds and amide bonds, is used as the polyfunctional monomer for preparing the polymer matrix. That restrains the crosslinked structure of the polymer matrix from disintegrating under alkaline conditions due to the hydrolysis of the structural units derived from the polyfunctional monomer, which in turn reduces liquefaction of the adhesive hydrogel.

Since the monofunctional monomer contains a nonionic (meth)acrylamide-based monomer, the polymer matrix has an amide group in its backbone. The amide group is partially denatured, forming a carboxyl group under alkaline conditions, and then undergo a chemical crosslinking reaction with a concrete component (e.g., calcium ions or aluminum ions) or a metal (e.g., zinc or aluminum). This reaction ensures sufficient adhesive strength between the adhesive hydrogel and the concrete or metal.

When the adhesive hydrogel in accordance with the present invention contains an electrolyte so that the adhesive hydrogel is electrically conductive, the polymer matrix prepared from the monofunctional monomer composed primarily of a nonionic (meth)acrylamide-based monomer contains few ionic functional groups that can form a passivation layer by bonding with the calcium and other like ions in the electrolyte. That ensures stable electrical conductivity over time in the adhesive hydrogel containing the polymer matrix prepared from the monofunctional monomer composed primarily of a nonionic (meth)acrylamide-based monomer.

A method for electrolytic protection of a concrete structure in accordance with the present invention involves the step of passing a protection current between an anode disposed on a surface of the concrete structure via the electrolyte-containing adhesive hydrogel in accordance with the present invention and a steel material that acts as a cathode inside the concrete structure.

The method for electrolytic protection of a concrete structure in accordance with the present invention uses the adhesive hydrogel in accordance with the present invention that unfailingly has stable electrical conductivity over time. That enables a protection current to continuously flow and provides good protection for the concrete structure.

Advantageous Effects of the Invention

The present invention provides an adhesive hydrogel that exhibits excellent resistance to liquefaction and swelling under alkaline conditions, possesses sufficient adhesive strength for concrete and metal over time, and when used in a method for electrolytic protection of a concrete structure, ensures stable electrical conductivity over time, and also provides a method for electrolytic protection of a concrete structure using such an adhesive hydrogel.

DESCRIPTION OF EMBODIMENTS

Adhesive Hydrogel

The adhesive hydrogel in accordance with the present invention contains a polymer matrix, water, and a polyhydric alcohol.

The polymer matrix is a copolymer of a monofunctional monomer with a single polymerizable C—C double bond and a polyfunctional monomer with two or more polymerizable C—C double bonds.

The monofunctional monomer contains a nonionic (meth) acrylamide-based monomer. Throughout the present description, "(meth)acrylic" refers to either acrylic or methacrylic. "Nonionic" means that a 1-wt % aqueous solution of a (meth)acrylamide-based monomer in free acid or base state has a pH of 4 to 9.

The nonionic (meth)acrylamide-based monomer is by no means limited in any particular manner and may be, for example, (meth)acrylamide, N,N-dimethyl(meth)acrylamide, N,N-diethyl(meth)acrylamide, N-isopropyl(meth)acrylamide, dimethylaminopropyl(meth)acrylamide, hydroxyethyl(meth)acrylamide, or (meth)acryloyl morpholine. When the nonionic (meth)acrylamide-based monomer is at least one compound selected from the group consisting of these compounds, the monomer is highly polymerizable with polyfunctional monomers detailed later and has high affinity with the polyhydric alcohol in the adhesive hydrogel. The resultant adhesive hydrogel, which is free from phase separation, exhibits increased uniformity and excellent fabricability and adhesiveness. Any one of the compounds given as examples of the nonionic (meth)acrylamide-based monomer may be used alone; alternatively, two or more of them may be used in any combination. Throughout the present description, "(meth)acryloyl" refers to either acryloyl or methacryloyl.

The adhesive hydrogel may contain structural units derived from the nonionic (meth)acrylamide-based monomer in an amount that is by no means limited in any particular manner. The amount is preferably from 15 parts by weight to 50 parts by weight per 100 parts by weight of the adhesive hydrogel and more preferably from 15 parts by weight to 35 parts by weight per 100 parts by weight of the adhesive hydrogel. If the adhesive hydrogel contains structural units derived from the nonionic (meth)acrylamide-based monomer in less than 15 parts by weight per 100 parts by weight of the adhesive hydrogel, the adhesive hydrogel may exhibit so insufficient shape retention that the adhesive hydrogel could be excessively soft or easy to tear apart. If the adhesive hydrogel contains structural units derived from the nonionic (meth)acrylamide-based monomer in excess of 50 parts by weight per 100 parts by weight of the adhesive hydrogel, the hydrogel could become too hard and lose flexibility.

The adhesive hydrogel in accordance with the present invention, since containing structural units derived from the nonionic (meth)acrylamide-based monomer as mentioned above, exhibits strong adhesive strength for concrete and metal under alkaline conditions. Especially, the adhesive hydrogel not only possesses strong adhesive strength for concrete and metal initially when the adhesive hydrogel is applied to concrete or metal, but the adhesive strength also increases with time after the adhesive hydrogel is applied to concrete or metal. This is partly a result of the adhesive strength exerted by the hydrogel containing a polymer matrix in which the nonionic (meth)acrylamide-based monomer is polymerized. There is another mechanism involved: the amide group in the poly(meth)acrylamide-derived backbone is partially denatured by alkaline components, forming a carboxyl group, and then gradually crosslinked chemically with a concrete component (e.g., calcium ions or aluminum ions) or a metal. The crosslinking grows with time for increasingly strong adhesion. For these reasons, the adhesive hydrogel in accordance with the present invention may be removed and reapplied during construction and is still capable of exerting strong adhesive strength after construction.

The polymer matrix prepared from the monofunctional monomer composed primarily of a nonionic (meth)acrylamide-based monomer does not allow the polyhydric alcohol and water in the polymer matrix to bleed out due to the effect of the calcium and other like salts eluted from concrete.

When the adhesive hydrogel contains an electrolyte so that the adhesive hydrogel is electrically conductive, the polymer matrix prepared from the monofunctional monomer composed primarily of a nonionic (meth)acrylamide-based monomer contains few ionic functional groups that can form a passivation layer by bonding with the calcium and other like ions in the electrolyte. That ensures stable electrical conductivity over time in the adhesive hydrogel containing the polymer matrix prepared from the monofunctional monomer composed primarily of a nonionic (meth)acrylamide-based monomer.

In contrast, the ionic polymer matrix prepared from a monofunctional monomer composed primarily of an ionic monomer containing carboxyl groups, such as acrylic acid or methacrylic acid, changes conformation around its polymer matrix backbone when in contact with a large quantity of salt that could be present where the adhesive hydrogel containing the polymer matrix is attached. The conformation change causes the ionic polymer matrix to abruptly shrink, and the ionic polymer matrix allows the polyhydric alcohol and water in the polymer matrix to bleed out. The ionic polymer matrix prepared from a monofunctional monomer composed primarily of an ionic monomer containing carboxyl groups lowers its adhesive strength with time. To achieve strong adhesion, the ionic polymer matrix therefore needs to exhibit strong adhesive strength initially when applied. If the adhesive strength that is achieved initially when applied is increased, the ionic polymer matrix, when applied to a target material, becomes difficult peel from the target material and cannot be reapplied during construction.

The ionic polymer matrix prepared from a monofunctional monomer composed primarily of an ionic monomer absorbs more water than the polymer matrix prepared from a monofunctional monomer composed primarily of a nonionic monomer. The ionic polymer matrix readily swells and markedly increases in volume if water is splashed on it or seeps out from the target material, such as concrete, onto which it is applied. Therefore, the adhesive hydrogel containing the polymer matrix could be slightly raised from the target material or undulate.

When the adhesive hydrogel contains an electrolyte so that the adhesive hydrogel is electrically conductive, if the polymer matrix in the adhesive hydrogel is an ionic polymer matrix prepared from a monofunctional monomer composed primarily of an ionic monomer containing carboxyl groups, the ionic functional groups (carboxyl groups) may bond with counterions (calcium and other like ions in the electrolyte). Thus, a passivation layer could form, and electric conductivity be lost. If an electrolyte is added to the adhesive hydrogel in a large quantity to prevent this from happening, the electrolyte causes conformation change in the polymer matrix backbone, which in turn causes the polymer matrix to abruptly shrink and the polyhydric alcohol and water in the polymer matrix to bleed out. This is undesirable.

From the description above, the adhesive hydrogel obtained using a monofunctional monomer composed primarily of a nonionic (meth)acrylamide-based monomer is a suitable pressure sensitive adhesive material to adhere a concrete structure and metal and is suited for use in a method for electrolytic protection of a concrete structure.

The monofunctional monomer, if necessary, may contain an ionic monomer with a single polymerizable C—C double bond in addition to the nonionic (meth)acrylamide-based monomer. Examples of the ionic monomer with a single polymerizable C—C double bond include carboxyl-group-containing ionic monomers, such as (meth)acrylic acid, maleic acid, itaconic acid, 2-(meth)acryloyl ethanesulfonic acid, and 2-hydroxyethyl(meth)acrylate. Throughout the present description, "(meth)acrylate" refers to either acrylate or methacrylate.

The structural units derived from the ionic monomers in the adhesive hydrogel preferably account for less than 35 parts by weight of every 100 parts by weight of the structural units derived from nonionic (meth)acrylamide-based monomers and less than or equal to 10 parts by weight of every 100 parts by weight of the adhesive hydrogel. If the structural units derived from the ionic monomers in the adhesive hydrogel account for greater than or equal to 35 parts by weight of every 100 parts by weight of the structural units derived from nonionic (meth)acrylamide-based monomers or more than 10 parts by weight of every 100 parts by weight of the adhesive hydrogel, the ionic component content is excessive and may cause the aforementioned inconveniences attributable to the ionic polymer matrix.

The polyfunctional monomer is by no means limited in any particular manner and may be any monomer with two or more polymerizable C—C double bonds that has a composition formula: $C_lH_mO_n$, where O is an oxygen atom in an ether bond, l is an integer greater than or equal to 4, m is an integer greater than or equal to 6, and n is an integer greater than or equal to 0. Examples include aromatic divinyl compounds, such as divinyl benzene and divinyl biphenyl; divinyl ether compounds, such as 1,4-butanediol divinyl ether, cyclohexane dimethanol divinyl ether, triethylene glycol divinyl ether, and diethylene glycol divinyl ether; and allyl ether compounds, such as diethylene glycol diallyl ether and pentaerythritol triallyl ether. When the polyfunctional monomer is at least one compound selected from the group consisting of these aromatic divinyl, divinyl ether, and allyl ether compounds, the polyfunctional monomer is highly polymerizable with the monofunctional monomers and has high affinity with the polyhydric alcohol in the adhesive hydrogel. The resultant adhesive hydrogel, which is free from phase separation, exhibits increased uniformity and excellent fabricability and adhesiveness. Particularly, divinyl benzene is readily available and highly polymerizable, hence especially suited for use as a polyfunctional monomer for the present invention. Any one of the compounds given as examples of the polyfunctional monomer may be used alone; alternatively, two or more of them may be used in any combination.

The adhesive hydrogel may contain structural units derived from the polyfunctional monomer in an amount that is by no means limited in any particular manner. The amount is preferably from 0.01 parts by weight to 0.5 parts by weight per 100 parts by weight of the adhesive hydrogel and more preferably from 0.02 parts by weight to 0.2 parts by weight per 100 parts by weight of the adhesive hydrogel. If the adhesive hydrogel contains structural units derived from the polyfunctional monomer in such an amount, the adhesive hydrogel becomes sufficiently flexible to maintain adhesive strength without having to lose shape stability.

The polymer matrix is formed by polymerizing the monofunctional monomer and the polyfunctional monomer. In such a polymer matrix, the structural units derived from the monofunctional monomer are crosslinked by the structural units derived from the polyfunctional monomer. In addition, since in the polymer matrix, the structural units derived from the monofunctional monomer are crosslinked by the structural units derived from a polyfunctional monomer with no hydrolyzable moieties under alkaline conditions, such as ester bonds and amide bonds, the adhesive hydrogel containing the polymer matrix is restrained from liquefaction under alkaline conditions. Specifically, the adhesive hydrogel is restrained from disintegration of the crosslinked structure of the polymer matrix caused by alkali hydrolysis of some of the structural units derived from the polyfunctional monomer that is part of the polymer matrix, i.e., liquefaction. Therefore, the adhesive hydrogel in accordance with the present invention ensures sufficient shape retention and adhesive strength under alkaline conditions over time.

The adhesive hydrogel in accordance with the present invention contains a polyhydric alcohol that acts as a humectant in the adhesive hydrogel. The polyhydric alcohol is by no means limited in any particular manner. Examples include ethylene glycol, propylene glycol, butanediol, glycerin, pentaerythritol, sorbitol, polyethylene glycol, polypropylene glycol, polyglycerin, polyoxyethylene glyceryl ether, and polyoxypropylene polyglyceryl ether. If the polyhydric alcohol is at least one compound selected from the group consisting of these compounds, the polyhydric alcohol is highly soluble in the nonionic (meth)acrylamide-based monomer and the polyfunctional monomer. The resultant adhesive hydrogel, which is free from phase separation, exhibits increased uniformity and good adhesiveness and fabricability. Any one of the compounds given as examples of the polyhydric alcohol may be used alone; alternatively, two or more of them may be used in any combination.

Preferred polyhydric alcohols are those that are in liquid form at temperatures at which the adhesive hydrogel is to be used (e.g., appropriately 20° C. if the adhesive hydrogel is to be used indoors). Specific preferred examples include ethylene glycol, propylene glycol, polypropylene glycol, polyethylene glycol, polyglycerin, and glycerin.

The adhesive hydrogel may contain a polyhydric alcohol in an amount that is by no means limited in any particular manner. The amount is preferably from 20 parts by weight to 70 parts by weight per 100 parts by weight of the adhesive hydrogel and more preferably from 30 parts by weight to 65 parts by weight per 100 parts by weight of the adhesive hydrogel. If the adhesive hydrogel contains a polyhydric alcohol in less than 20 parts by weight per 100 parts by weight of the adhesive hydrogel, the resultant adhesive hydrogel exhibits poor moisture retention capability and plasticity, allows considerable evaporation of water content, and has insufficient temporal stability and insufficient flexibility. Sufficient adhesiveness may not be obtainable with the adhesive hydrogel. On the other hand, if the adhesive hydrogel contains a polyhydric alcohol in excess of 70 parts by weight per 100 parts by weight of the adhesive hydrogel, the polymer matrix is unable to hold the extra amount of the polyhydric alcohol. The physical properties of the adhesive hydrogel may change due to the polyhydric alcohol bleeding out of the surface of the adhesive hydrogel. Sufficient adhesiveness may not be obtainable.

The adhesive hydrogel in accordance with the present invention contains water.

The adhesive hydrogel in accordance with the present invention may contain water in an amount that is by no means limited in any particular manner. The amount is preferably from 10 parts by weight to 60 parts by weight per 100 parts by weight of the adhesive hydrogel and more preferably from 15 parts by weight to 30 parts by weight per 100 parts by weight of the adhesive hydrogel. If the water content is less than 10 parts by weight per 100 parts by weight of the adhesive hydrogel, the water content is too low in relation to the equilibrium water content of the adhesive hydrogel. The adhesive hydrogel may be so hygroscopic that it could be denatured (e.g., swell) over time. On the other hand, if the water content is in excess of 60 parts by weight per 100 parts by weight of the adhesive hydrogel, the water content is too high in relation to the equilibrium water content of the adhesive hydrogel. The adhesive hydrogel may be so dry that it could shrink or otherwise change in physical properties.

The adhesive hydrogel in accordance with the present invention may contain an electrolyte. When the adhesive hydrogel contains an electrolyte, the adhesive hydrogel becomes electrically conductive. The adhesive hydrogel that has acquired electrical conductivity by containing an electrolyte is useable in a method for electrolytic protection of a concrete structure that will be described later in detail.

When the adhesive hydrogel in accordance with the present invention is electrically conductive, the adhesive hydrogel has an electrolyte content of preferably from 0.05 parts by weight to 10 parts by weight per 100 parts by weight of the adhesive hydrogel and more preferably from 0.1 parts by weight to 6 parts by weight per 100 parts by weight of the adhesive hydrogel. If the electrolyte content is less than 0.05 parts by weight per 100 parts by weight of the adhesive hydrogel, the adhesive hydrogel has an increased impedance and is no longer electrically conductive. The impedance decreases with an increase in the electrolyte content. Nevertheless, if the electrolyte content is in excess of 10 parts by weight per 100 parts by weight of the adhesive hydrogel, the impedance no longer decreases; the extra electrolyte content is not cost effective. If the adhesive hydrogel is used in a method for electrolytic protection of a concrete structure, the extra electrolyte content may promote corrosion of steel materials in concrete.

The electrolyte is by no means limited in any particular manner. Examples include alkali metal halides, such as sodium halides (e.g., sodium chloride), lithium halides, and potassium halides; alkali earth metal halides, such as magnesium halides and calcium halides; and other metal halides. Other preferred electrolytes include hypochlorous acid salts, chlorous acid salts, chloric acid salts, perchloric acid salts, sulfuric acid salts, carbonic acid salts, nitric acid salts, and phosphoric acid salts of various metals. Further preferred electrolyte include inorganic salts, such as ammonium salts and various complex salts; monovalent organic carboxylic acid salts, such as acetic acid salts, benzoic acid salts, and lactic acid salts; multivalent organic carboxylic acid salts, such as tartaric acid salts; monovalent, divalent, and multivalent salts of multivalent carboxylic acids, such as phthalic acid, succinic acid, adipic acid, and citric acid; metal salts of organic acids, such as sulfonic acid and amino acid; and organic ammonium salts.

The adhesive hydrogel in accordance with the present invention, if necessary, may contain a base, such as sodium hydroxide, to adjust the pH.

The adhesive hydrogel in accordance with the present invention, if necessary, may contain another additive. Examples of other additives include anticorrosive agents, antifungal agents, antioxidants, defoaming agents, stabilizers, surfactants, and coloring agents.

The adhesive hydrogel in accordance with the present invention may be shaped like a sheet with a thickness of 0.1 mm to 10 mm. Such a 0.1 to 10 mm thick sheet of the adhesive hydrogel has excellent flexibility and faithfully follows irregularities on the surface of concrete and metal, hence being highly suitable for use for construction purposes.

Production of Adhesive Hydrogel

The adhesive hydrogel in accordance with the present invention is readily produced by preparing an adhesive hydrogel composition containing the aforementioned monofunctional monomer (containing a nonionic (meth)acrylamide-based monomer), the aforementioned polyfunctional monomer, the aforementioned polyhydric alcohol, and water and then polymerizing the monofunctional monomer and the polyfunctional monomer both contained in the adhesive hydrogel composition. The adhesive hydrogel composition, if necessary, may contain the aforementioned electrolyte, the aforementioned base, and various additives.

When the adhesive hydrogel in accordance with the present invention is produced by this method, the non-monofunctional-monomer, non-polyfunctional-monomer (e.g., polyhydric alcohol and water) content of the adhesive hydrogel composition is equal to the non-monofunctional-monomer, non-polyfunctional-monomer content of the adhesive hydrogel in accordance with the present invention, and the monofunctional-monomer and polyfunctional-monomer content of the adhesive hydrogel composition is equal to the structural unit content derived from the monofunctional monomer and the polyfunctional monomer in the adhesive hydrogel in accordance with the present invention. For example, the nonionic (meth)acrylamide-based monomer content of the adhesive hydrogel composition is equal to the structural unit content derived from the nonionic (meth)acrylamide-based monomer in the adhesive hydrogel in accordance with the present invention.

The adhesive hydrogel composition preferably contains a polymerization initiator. The polymerization initiator is by no means limited in any particular manner and may be, for example, an optical polymerization initiator or a thermal polymerization initiator.

The optical polymerization initiator is by no means limited in any particular manner so long as it produces radicals by cleaving chemical bonds under ultraviolet or visible light. Examples include alpha-hydroxy ketones, alpha-amino ketones, benzyl methyl ketals, bisacylphosphine oxides, and metallocenes. More specific examples include 2-hydroxy-2-methyl-1-phenyl-propan-1-one (product name: DAROCUR® 1173, manufactured by BASF Japan Ltd. (former Ciba Specialty Chemicals PLC)), 1-[4-(2-hydroxy ethoxy)-phenyl]-2-hydroxy-2-methyl-1-propan-1-one (product name: IRGACURE® 2959, manufactured by BASF Japan Ltd. (former Ciba Specialty Chemicals PLC)), 2-hydroxy-2-methyl-1-phenyl-propan-1-one (product name: DAROCUR® 1173, manufactured by BASF Japan Ltd.), 1-hydroxy-cyclohexyl-phenyl-ketone (product name: IRGACURE® 184, manufactured by BASF Japan Ltd.), 2-methyl-1-(4-methyl thiophenyl)-2-morpholino propan-1-one (product name: IRGACURE® 907, manufactured by BASF Japan Ltd.), 2-benzyl-2-dimethylamino-1-(4-morpholino phenyl)-butan-1-one (product name: IRGACURE® 369, manufactured by BASF Japan Ltd.), and oligo{2-hydroxy-2-methyl-1-[4-(1-methyl vinyl)phenyl]propanone} (Esacure® KIP150, manufactured by Nippon Kayaku Co., Ltd.). Any one of these optical polymerization initiators may be used alone; alternatively, two or more of them may be used in any combination.

The thermal polymerization initiator is by no means limited in any particular manner so long as it produces radicals by cleaving under heat. Examples include organic peroxides, such as benzoyl peroxide; azo-based polymerization initiators, such as azobis cyanovaleric acid and azobisisobutyronitrile; persulfuric acid salts, such as potassium persulfate and ammonium persulfate; and azo compounds, such as 2,2'-azobis-amidino propane dihydrochloride. A redox initiator made from a reduction agent (e.g., ferrous sulfate or pyrosulfite) and a peroxide (e.g., hydrogen peroxide or sodium thiosulfate) may be used, if necessary, in combination with a thermal polymerization initiator.

The adhesive hydrogel composition in accordance with the present invention may contain a polymerization initiator in an amount that is by no means limited in any particular manner. The amount is preferably greater than or equal to 0.01 parts by weight and less than or equal to 1 part by weight per 100 parts by weight of the adhesive hydrogel composition. If the polymerization initiator content is less than 0.01 parts by weight per 100 parts by weight of the adhesive hydrogel composition, the polymerization reaction does not thoroughly proceed, possibly leaving the monofunctional monomer and/or the polyfunctional monomer unreacted in the resultant adhesive hydrogel. If the polymerization initiator content is in excess of 1 part by weight per 100 parts by weight of the adhesive hydrogel composition, the post-polymerization-reaction residue of the polymerization initiator may discolor, or give an odor to, the resultant adhesive hydrogel (yellowish).

The method for producing an adhesive hydrogel from the adhesive hydrogel composition is by no means limited in any particular manner. For example, the adhesive hydrogel composition may be heated or irradiated with light or radiation. Specifically, the adhesive hydrogel composition may be mixed with a thermal polymerization initiator as a polymerization initiator and heated to polymerize the monofunctional and polyfunctional monomers in the adhesive hydrogel composition. Alternatively, the adhesive hydrogel composition may be mixed with an optical polymerization initiator as a polymerization initiator and irradiated with light (ultraviolet or visible light) to polymerize the monofunctional and polyfunctional monomers in the adhesive hydrogel composition. Another method is to mix the adhesive hydrogel composition with a thermal polymerization initiator and an optical polymerization initiator as polymerization initiators and simultaneously apply light and heat to polymerize the monofunctional and polyfunctional monomers in the adhesive hydrogel composition. Another method is to apply electron, gamma ray, or other radiation to the adhesive hydrogel composition to polymerize the monofunctional and polyfunctional monomers in the adhesive hydrogel composition. When a redox initiator is used in combination with a thermal polymerization initiator, the reaction can proceed without heating. It is however preferable to apply heat to reduce residual monomers or reaction time even when a redox initiator is used in combination with a thermal polymerization initiator.

If the adhesive hydrogel in accordance with the present invention is produced under ultraviolet light irradiation, the accumulated dose of ultraviolet light irradiation is preferably from 1,000 mJ/cm$^2$ to 10,000 mJ/cm$^2$ and more preferably from 2,000 mJ/cm$^2$ to 10,000 mJ/cm$^2$.

Alternatively, the adhesive hydrogel in accordance with the present invention may be produced by impregnating a polymer matrix with water and a polyhydric alcohol, the polymer matrix being made in advance by a polymerization reaction of a monofunctional monomer and a polyfunctional monomer.

Production of Adhesive Hydrogel Sheet and Adhesive Hydrogel Sheet

The adhesive hydrogel in accordance with the present invention may be molded in a manner suitable for applications because the adhesive hydrogel is, for example, a gel obtained by polymerization crosslinking of an adhesive hydrogel composition in liquid form. For example, the adhesive hydrogel composition may be injected into a pre-molded container of a thermoplastic resin, and then be subjected to gelation.

An adhesive hydrogel sheet is obtainable by molding an adhesive hydrogel into sheet form.

The method for producing an adhesive hydrogel sheet is by no means limited in any particular manner and may be any publicly known method. For example, the adhesive hydrogel composition is dispensed dropwise onto a base film, such as a resin film. After that, a top film, such as a resin film, is placed on top of the dispensed adhesive hydrogel composition to squeeze and spread out the adhesive hydrogel composition down to a desired thickness. In this state, the monofunctional and polyfunctional monomers in the adhesive hydrogel composition are polymerized and crosslinked by applying light (ultraviolet light) and/or heat to them, to obtain a sheet of adhesive hydrogel, or an adhesive hydrogel sheet, with a desired thickness.

A base film may be attached on one of the sides of the adhesive hydrogel sheet, and a top film may be attached on the other side of the adhesive hydrogel sheet.

Examples of the base film include those made of resins, such as polyesters, polyolefins, polystyrenes, and polyurethanes; paper; and paper laminated with one of the resin films.

The surface of these base films which comes into contact with the adhesive hydrogel sheet is preferably treated for mold releasing, for example, coated with silicone. In other words, when the base film is to be used as mold release paper, the base film is preferably a film made of a resin (e.g., polyester, polyolefin, or polystyrene), paper, paper laminated with the resin film, or a like film, the surface of which is treated for mold releasing. The mold releasing treatment is preferably a silicone coating, especially, a baked silicone coating that is crosslinked and cured under heat or ultraviolet light. Biaxially stretched PET films and OPPs are especially preferred films for a mold releasing treatment.

When the base film is used not as the mold release paper, but as a backing material for the pressure sensitive adhesive agent, a polyester film, a polyolefin film, a polystyrene film, or a polyurethane film is preferably used without mold releasing treatment. Of these, polyurethane films are especially preferred because they are flexible and permeable to water vapor. The polyurethane film is preferably used after being laminated with a carrier film (e.g., a polyolefins film or paper) because it is generally too soft if used alone and difficult to handle during manufacture. When a polyurethane film is used after lamination, the adhesive hydrogel is preferably manufactured with a carrier film being attached to the base film.

The top film may be basically of the same substance as the base film. The substance is however preferably selected from non-light-blocking substances so that the film does not hamper optical polymerization. The film used as the backing material is preferably not used as the top film. In particular, if the film used as the backing material could degrade under ultraviolet light or like irradiation, it is not preferable to use the film used as the backing material as the top film because the film used as the backing material is positioned on a side irradiated with direct ultraviolet light.

If the adhesive hydrogel composition is gelled by polymerization crosslinking, and the obtained sheet of adhesive hydrogel (adhesive hydrogel sheet) is wound up in a roll, the base film and/or the base film are preferably flexible. An adhesive hydrogel sheet with a non-flexible film being provided on both sides thereof could develop wrinkles when wound up. A flexible film may be disposed on either the inner or outer surface of the roll and preferably on the outer surface of the roll.

Method for Electrolytic Protection of Concrete Structure

Of the adhesive hydrogels in accordance with the present invention, those containing an electrolyte, hence electrically conductive, may be used in a method for electrolytic protection of a concrete structure.

Specifically, according to the method for electrolytic protection of a concrete structure in accordance with the present invention, a metal is disposed as an anode on the surface of a concrete structure via the adhesive hydrogel in accordance with the present invention. Protection current is passed between the anode and a steel material (cathode) in the concrete structure.

As mentioned earlier, electrolytic protection of a concrete structure can be classified into impressed current systems and galvanic anode systems. An impressed current system operates on a DC power source to pass a protection current between the cathode and the anode. A galvanic anode system uses as an anode an electrochemically active sacrificial metal having a higher dissolution potential than the steel material (electrochemically active metal, cathode) in the concrete structure and passes a protection current by means of the potential difference between the cathodic steel material and the anodic metal. The adhesive hydrogel in accordance with the present invention is applicable to both the impressed current system and the galvanic anode system.

The galvanic anode system, rather than the impressed current system, is a preferred method for electrolytic protection of a concrete structure because the galvanic anode system needs no electrical power supply, leads to no overprotection problems, and is capable of partial protection. For effective electrolytic protection by a galvanic-anode-system-based method for electrolytic protection of a concrete structure, the anode is preferably zinc, aluminum, or magnesium and more preferably zinc.

EXAMPLES

The following will describe the present invention in more detail by way of examples. The present invention is however by no means limited to these examples.

Example 1

Acrylamide (20 parts by weight) as a nonionic (meth)acrylamide-based monomer (monofunctional monomer), divinyl benzene (0.029 parts by weight, composition formula: $C_{10}H_{10}$) as a polyfunctional monomer, concentrated glycerin as stipulated in the Japanese Pharmacopoeia (59.37 parts by weight) as a polyhydric alcohol, sodium chloride as stipulated in the Japanese Pharmacopoeia (2.5 parts by weight) as an electrolyte, and water (18 parts by weight) were placed in a container and stirred to dissolve the nonionic (meth)acrylamide-based monomer, the polyfunctional monomer, and the electrolyte in the polyhydric alcohol and water to prepare a mixed monomer solution. To this mixed monomer solution, 0.1 parts by weight of 1-[4-(2-hydroxy ethoxy)-phenyl]-2-hydroxy-2-methyl-1-propan-1-one (product name: IRGACURE® 2959 (IR2959), available from BASF Japan Ltd.) as an optical polymerization initiator was added and stirred to dissolve the optical polymerization initiator. The mixed monomer solution in which the optical polymerization initiator has been dissolved was dispensed dropwise onto a 100-μm-thick, silicone-coated PET film (base film). After the dropwise dispensing, a 38-μm-thick, silicone-coated PET film (top film) was placed on the dispensed mixed monomer solution. The mixed monomer solution was then evenly squeezed, spread out and down to a thickness of 0.75 mm, and fixed. Using a metal halide lamp, ultraviolet light having an energy intensity of 3,000 mJ/cm² was irradiated to obtain a 0.75-mm-thick sheet of adhesive hydrogel (adhesive hydrogel sheet).

Example 2

The same procedures were followed as in Example 1 except that 20 parts by weight of acryloyl morpholine was used in place of 20 parts by weight of acrylamide as a nonionic (meth)acrylamide-based monomer and 59.37 parts by weight of polyoxypropylene polyglyceryl ether was used in place of 59.37 parts by weight of concentrated glycerin as stipulated in the Japanese Pharmacopoeia as a polyhydric alcohol, to obtain a 0.75-mm-thick sheet of adhesive hydrogel (adhesive hydrogel sheet).

Example 3

The same procedures were followed as in Example 1 except that 20 parts by weight of acryloyl morpholine was used as a nonionic (meth)acrylamide-based monomer in place of 20 parts by weight of acrylamide, diethylene glycol divinyl ether (composition formula: $C_8H_{14}O_3$) was used as a polyfunctional monomer in place of 0.029 parts by weight of divinyl benzene, 59.37 parts by weight of polyoxypropylene polyglyceryl ether was used as a polyhydric alcohol in place of 59.37 parts by weight of concentrated glycerin as stipulated in the Japanese Pharmacopoeia, and 0.1 parts by weight of oligo{2-hydroxy-2-methyl-1-[4-(1-methyl vinyl) phenyl]propanone} (Esacure@KIP150, manufactured by Nippon Kayaku Co., Ltd.) was used as an optical polymerization initiator in place of 0.1 parts by weight of 1-[4-(2-hydroxy ethoxy)-phenyl]-2-hydroxy-2-methyl-1-propan-1-one, to obtain a 0.75-mm-thick sheet of adhesive hydrogel (adhesive hydrogel sheet).

Example 4

The same procedures were followed as in Example 1 except that 16.67 parts by weight of acrylamide and 3.33 parts by weight of N,N-dimethylacrylamide were used as nonionic (meth)acrylamide-based monomers in place of 20 parts by weight of acrylamide, the amount of the divinyl benzene as a polyfunctional monomer was changed to 0.080 parts by weight, and the amount of the concentrated glycerin as stipulated in the Japanese Pharmacopoeia as a polyhydric alcohol was changed to 59.32 parts by weight, to obtain a 0.75-mm-thick sheet of adhesive hydrogel (adhesive hydrogel sheet).

Example 5

The same procedures were followed as in Example 1 except that 13.33 parts by weight of acrylamide and 6.67 parts by weight of N,N-dimethylacrylamide were used as nonionic (meth)acrylamide-based monomers in place of 20 parts by weight of acrylamide, the amount of the divinyl benzene as a polyfunctional monomer was changed to 0.080 parts by weight, and the amount of the concentrated glycerin as stipulated in the Japanese Pharmacopoeia as a polyhydric alcohol was changed to 59.32 parts by weight, to obtain a 0.75-mm-thick sheet of adhesive hydrogel (adhesive hydrogel sheet).

Example 6

The same procedures were followed as in Example 1 except that 10 parts by weight of acrylamide and 10 parts by weight of N,N-dimethylacrylamide were used as nonionic (meth)acrylamide-based monomers in place of 20 parts by weight of acrylamide, the amount of the divinyl benzene as a polyfunctional monomer was changed to 0.080 parts by weight, and the amount of the concentrated glycerin as stipulated in the Japanese Pharmacopoeia as a polyhydric alcohol was changed to 59.32 parts by weight, to obtain a 0.75-mm-thick sheet of adhesive hydrogel (adhesive hydrogel sheet).

Example 7

The same procedures were followed as in Example 1 except that 2 parts by weight of acrylamide and 18 parts by weight of N,N-dimethylacrylamide were used as nonionic (meth)acrylamide-based monomers in place of 20 parts by weight of acrylamide, the amount of the divinyl benzene as a polyfunctional monomer was changed to 0.080 parts by weight, and the amount of the concentrated glycerin as stipulated in the Japanese Pharmacopoeia as a polyhydric alcohol was changed to 59.32 parts by weight, to obtain a 0.75-mm-thick sheet of adhesive hydrogel (adhesive hydrogel sheet).

Example 8

The same procedures were followed as in Example 1 except that the amount of the acrylamide as a nonionic (meth)acrylamide-based monomer was changed to 15 parts by weight, the amount of the divinyl benzene as a polyfunctional monomer was changed to 0.020 parts by weight, and the amount of the concentrated glycerin as stipulated in the Japanese Pharmacopoeia as a polyhydric alcohol was changed to 64.38 parts by weight, to obtain a 0.75-mm-thick sheet of adhesive hydrogel (adhesive hydrogel sheet).

Example 9

The same procedures were followed as in Example 1 except that the amount of the acrylamide as a nonionic (meth)acrylamide-based monomer was changed to 40 parts by weight, the amount of the divinyl benzene as a polyfunctional monomer was changed to 0.050 parts by weight, and the amount of the concentrated glycerin as stipulated in the Japanese Pharmacopoeia as a polyhydric alcohol was changed to 39.35 parts by weight, to obtain a 0.75-mm-thick sheet of adhesive hydrogel (adhesive hydrogel sheet).

Example 10

The same procedures were followed as in Example 1 except that the amount of the concentrated glycerin as stipulated in the Japanese Pharmacopoeia as a polyhydric alcohol was changed to 61.87 parts by weight and no sodium chloride as an electrolyte was added, to obtain a 0.75-mm-thick sheet of adhesive hydrogel (adhesive hydrogel sheet).

Comparative Example 1

The same procedures were followed as in Example 1 except that 20 parts by weight of tert-butyl acrylamide sulfonic acid (anionic acrylamide-based monomer) was used as a monofunctional monomer in place of 20 parts by weight of acrylamide (nonionic (meth)acrylamide-based monomer), to obtain a 0.75-mm-thick sheet of adhesive hydrogel (adhesive hydrogel sheet). Throughout the present description, "anionic" means that a 1-wt % aqueous solution of an acrylic-based monomer (including acrylamide-based monomers) in free acid or base state has a pH of less than 4.

Comparative Example 2

The same procedures were followed as in Example 1 except that 0.029 parts by weight of N,N'-methylene bisacrylamide (composition formula: $C_7H_{10}N_2O_2$) was used as a polyfunctional monomer in place of 0.029 parts by weight of divinyl benzene, to obtain a 0.75-mm-thick sheet of adhesive hydrogel (adhesive hydrogel sheet).

Comparative Example 3

The same procedures were followed as in Example 1 except that 20 parts by weight of acrylic acid (anionic acrylic-based monomer) was used as a monofunctional monomer in place of 20 parts by weight of acrylamide (nonionic (meth)acrylamide-based monomer) and 0.029 parts by weight of N,N'-methylene bisacrylamide (composition formula: $C_7H_{10}N_2O_2$) was used as a polyfunctional monomer in place of 0.029 parts by weight of divinyl benzene, to obtain a 0.75-mm-thick sheet of adhesive hydrogel (adhesive hydrogel sheet).

The alkali hydrolysis resistance and swelling resistance of the adhesive hydrogels (adhesive hydrogel sheets) obtained in Examples 1 to 10 and Comparative Examples 1 to 3 were evaluated as detailed below in acceleration tests to determine their long-term (on the order of years) weatherability.

Evaluation of Alkali Hydrolysis Resistance

The 0.75-mm-thick adhesive hydrogels (adhesive hydrogel sheets) prepared in Examples 1 to 10 and Comparative Examples 1 to 3 were cut to 20 mm (length)×20 mm (width). After that, the PET films (base and top films) on both surfaces of each adhesive hydrogel sheet were peeled. The adhesive hydrogel sheets were immersed in a 50% aqueous solution (20 ml) of sodium hydroxide and let to sit at 50° C. for 24 hours, washed in water, and then immersed in water (40 ml) and let to sit overnight. The adhesive hydrogels were filtered through a mesh (hole diameter: 1 mm) and evaluated: they were rated "Good" if the adhesive hydrogel remained on the mesh without losing its initial shape, "Fair" if the adhesive hydrogel remained on the mesh, but had lost its initial shape, and "Poor" if no adhesive hydrogel remained on the mesh. Tables 1 and 2 show evaluations of alkali hydrolysis resistance of the adhesive hydrogels prepared in Examples 1 to 10 and Comparative Examples 1 to 3.

Evaluation of Swelling Resistance

The 0.75-mm-thick adhesive hydrogels (adhesive hydrogel sheets) prepared in Examples 1 to 10 and Comparative Examples 1 to 3 were cut to 30 mm (width)×30 mm (length). After that, the PET film (top film) on one of the two surfaces of each adhesive hydrogel sheet was peeled. A 30 mm (width)×30 mm (length)×0.25 mm (thickness) zinc plate was attached to the surface from which the PET film (top film) had been peeled, to prepare each test piece. The test pieces were weighed (initial weight). Thereafter, the test pieces were immersed in water (40 ml) for 24 hours and weighed (weight after 24 hours). The weight after 24 hours was divided by the initial weight for its percentage (i.e., (Weight after 24 hours/Initial weight)×100(%)). Each test piece was rated "Good" if the ratio was less than or equal to 300% and "Poor" if the ratio was greater than 300%. Tables 1 and 2 show evaluations of swelling resistance of the adhesive hydrogels prepared in Examples 1 to 10 and Comparative Examples 1 to 3.

The initial adhesive strength and the adhesive strength after 1 or 2 weeks ("temporally changing adhesive strength") were measured by the method detailed below for each of the adhesive hydrogels (adhesive hydrogel sheets) obtained in Examples 1 to 10 and Comparative Examples 1 to 3.

Measurement of Initial and Temporally Changing Adhesive Strengths for Concrete

The 0.75-mm-thick adhesive hydrogels (adhesive hydrogel sheets) prepared in Examples 1 to 10 and Comparative Examples 1 to 3 were cut to 20 mm (width)×70 mm (length). After that, the PET film (base film) on one of the two surfaces of each adhesive hydrogel sheet was peeled. A piece of nonwoven fabric ("Spunlace #8021," 0.38 mm thick, manufactured by Du Pont Kabushiki Kaisha) was attached as backing to the surface from which the PET film (base film) had been peeled, to prepare a test piece. After peeling a PET film (top film) from the other surface of the adhesive hydrogel on each test piece, the test piece was attached, on its surface from which the PET film (top film) had been peeled, to concrete. The entire test piece and concrete was placed on a texture analyzer "TA-XT. Plus" (manufactured by Stable Micro Systems), and a load was measured when peeling the test piece in a 90° direction at a velocity of 300 mm/min. according to JIS Z 0237. The measured load (N) was taken as an adhesive strength. Tables 1 and 2 show measurements of the initial adhesive strengths of the adhesive hydrogels prepared in Examples 1 to 10 and Comparative Examples 1 to 3 for concrete.

Test pieces were attached in the same manner to concrete and left to sit at 25° C. and 60% humidity for 1 week. A temporally changing adhesive strength after 1 week was measured. Tables 1 and 2 show measurements.

The concrete used in the measurement of the initial and temporally changing adhesive strengths for concrete was in compliance with JIS A 5364. A 64:36 (weight ratio) mixture of Filcon R (manufactured by Sumitomo Osaka Cement Co., Ltd.) and water was cast in a mold to obtain a block of concrete (150 mm (length)×150 mm (width)×30 mm (thickness)). The surface of this concrete block was dampened with ion exchanged water. A piece of pH test paper was attached to the surface of the damp concrete for pH measurement. The surface of the concrete had a pH of 12.

Measurement of Initial and Temporally Changing Adhesive Strengths for Zinc Plate The 0.75-mm-thick adhesive hydrogels (adhesive hydrogel sheets) prepared in Examples 1 to 10 and Comparative Examples 1 to 3 were cut to 20 mm (width)×100 mm (length). After that, one of the PET films (base film) on each adhesive hydrogel sheet was peeled. A piece of coated paper "Peach" SE80 (80 μm thick, manufactured by Nisshinbo Holdings Inc.) was attached as backing to the surface from which the PET film (base film) had been peeled, to prepare a test piece. After peeling a PET film (top film) from the other surface of the adhesive hydrogel on each test piece, the test piece was attached, on its surface from which the PET film (top film) had been peeled, to a zinc plate (0.25 mm thick). The entire test piece and concrete was placed on a texture analyzer "TA-XT. Plus" (manufactured by Stable Micro Systems), and a load was measured when peeling the test piece in a 90° direction at a velocity of 300 mm/min. according to JIS Z 0237. The measured load (N) was taken as an adhesive strength. Tables 1 and 2 show measurements of the initial adhesive strength of the adhesive hydrogels prepared in Examples 1 to 10 and Comparative Examples 1 to 3 for the zinc plate.

Test pieces were attached in the same manner to a zinc plate and left to sit at 25° C. and 60% humidity for 2 weeks. A temporally changing adhesive strength after 2 weeks was measured. Tables 1 and 2 show measurements of the adhesive strengths of the adhesive hydrogels prepared in Examples 1 to 10 and Comparative Examples 1 to 3 for the zinc plate.

TABLE 1

| | | | | | Ex. | | | | | |
|---|---|---|---|---|---|---|---|---|---|---|
| | | Component | Comp. | 1 | 2 | 3 | 4 | 5 | 6 | 7 |
| Ratio (parts by weight) | MFM | Nonionic (meth)acryl- amide-based monomer | AM NNDMA ACMO | 20 — — | — — 20 | — — 20 | 16.67 3.33 — | 13.33 6.67 — | 10 10 — | 2 18 — |

TABLE 1-continued

|  | Component | Comp. | Ex. 1 | 2 | 3 | 4 | 5 | 6 | 7 |
|---|---|---|---|---|---|---|---|---|---|
|  | Anionic acrylic-based monomer | TBAS | — | — | — | — | — | — | — |
|  |  | AA | — | — | — | — | — | — | — |
|  | PFM $C_{10}H_{10}$ | DVB | 0.029 | 0.029 | — | 0.080 | 0.080 | 0.080 | 0.080 |
|  | $C_8H_{14}O_3$ | DEGDVE | — | — | 0.029 | — | — | — | — |
|  | $C_7H_{10}N_2O_2$ | MBA | — | — | — | — | — | — | — |
|  | Polyhydric alcohol | Glycerin | 59.37 | — | — | 59.32 | 59.32 | 59.32 | 59.32 |
|  |  | POPPGE | — | 59.37 | 59.37 | — | — | — | — |
|  | Water |  | 18 | 18 | 18 | 18 | 18 | 18 | 18 |
|  | Polymerization initiator | IR2959 | 0.1 | 0.1 | — | 0.1 | 0.1 | 0.1 | 0.1 |
|  |  | KIP150 | — | — | 0.1 | — | — | — | — |
|  | Electrolyte | NaCl | 2.5 | 2.5 | 2.5 | 2.5 | 2.5 | 2.5 | 2.5 |
|  | Total |  | 100 | 100 | 100 | 100 | 100 | 100 | 100 |
| Evaluations | AH resistance |  | Good | Good | Good | Good | Good | Good | Good |
|  | Swelling resistance |  | Good | Good | Good | Good | Good | Good | Good |
|  | IAS (concrete) (N) |  | 14.5 | 5.9 | 5.3 | 11.9 | 8.7 | 5.1 | 3.5 |
|  | TCAS (concrete) (N) |  | 17.7 | 9.5 | 6.3 | 12.3 | 11.4 | 11.1 | 4.7 |
|  | IAS (zinc plate) (N) |  | 2.7 | 1.1 | 1.0 | 1.4 | 1.1 | 0.9 | 0.9 |
|  | TCAS (zinc plate) (N) |  | 19.2 | 3.2 | 3.0 | 12.4 | 10.9 | 8.5 | 6.3 |
|  | IC (μA) |  | 0.25 | 0.26 | — | — | — | — | — |
|  | TCC (μA) |  | 0.21 | 0.2 | — | — | — | — | — |

Comp.: Composition,
Ex.: Examples,
MFM: Monofunctional monomer,
PFM: Polyfunctional monomer,
AM: Acrylamide,
NNDMA: N,N-dimethyl acrylamide,
ACMO: Acryloyl morpholine,
TBAS: Tert-butyl acrylamide sulfonic acid,
AA: Acrylic acid,
DVB: Divinyl benzene,
DEGDVE: Diethylene glycol divinyl ether,
MBA: N,N'-methylene bisacrylamide,
POPPGE: Polyoxypropylene polyglyceryl ether,
NaCl: Sodium chloride,
AH resistance: Alkali hydrolysis resistance,
IAS: Initial adhesive strength,
TCAS: Temporally changing adhesive strength,
IC: Initial current,
TCC: Temporally changing current

TABLE 2

|  |  | Component | Comp. | Ex. 8 | 9 | 10 | Comparative Ex. 1 | 2 | 3 |
|---|---|---|---|---|---|---|---|---|---|
| Ratio (parts by weight) | MFM | Nonionic (meth)acryl-amide-based monomer | AM | 15 | 40 | 20 | — | 20 | — |
|  |  |  | NNDMA | — | — | — | — | — | — |
|  |  |  | ACMO | — | — | — | — | — | — |
|  |  | Anionic acrylic-based monomer | TBAS | — | — | — | 20 | — | — |
|  |  |  | AA | — | — | — | — | — | 20 |
|  | PFM | $C_{10}H_{10}$ | DVB | 0.020 | 0.050 | 0.029 | 0.029 | — | — |
|  |  | $C_8H_{14}O_3$ | DEGDVE | — | — | — | — | — | — |
|  |  | $C_7H_{10}N_2O_2$ | MBA | — | — | — | — | 0.029 | 0.029 |
|  | Polyhydric alcohol | Glycerin |  | 64.38 | 39.35 | 61.87 | 59.37 | 59.37 | 59.37 |
|  |  | POPPGE |  | — | — | — | — | — | — |
|  | Water |  |  | 18 | 18 | 18 | 18 | 18 | 18 |
|  | Polymerization initiator | IR2959 |  | 0.1 | 0.1 | 0.1 | 0.1 | 0.1 | 0.1 |
|  |  | KIP150 |  | — | — | — | — | — | — |
|  | Electrolyte | NaCl |  | 2.5 | 2.5 | — | 2.5 | 2.5 | 2.5 |
|  | Total |  |  | 100 | 100 | 100 | 100 | 100 | 100 |
| Evaluations | AH resistance |  |  | Good | Good | Good | Fair | Poor | Poor |
|  | Swelling resistance |  |  | Good | Good | Good | Poor | Fair | Poor |
|  | IAS (concrete) (N) |  |  | 7.8 | 8.6 | 14.2 | 3.7 | 10.5 | 11.1 |
|  | TCAS (concrete) (N) |  |  | 8.7 | 9.0 | 17.6 | 16.8 | 10.7 | 10.2 |
|  | IAS (zinc plate) (N) |  |  | 2.6 | 2.0 | 1.9 | 2.6 | 1.2 | 3.5 |

TABLE 2-continued

| Component | Comp. | Ex. 8 | Ex. 9 | Ex. 10 | Comparative Ex. 1 | Comparative Ex. 2 | Comparative Ex. 3 |
|---|---|---|---|---|---|---|---|
| TCAS (zinc plate) (N) | | 16.4 | 13.8 | 11.2 | 14.3 | 14.3 | 2.2 |
| IC (μA) | | — | — | — | 0.23 | — | 0.27 |
| TCC (μA) | | — | — | — | 0.07 | — | 0.09 |

Comp.: Composition,
Ex.: Examples,
Comparative Ex.: Comparative examples,
MFM: Monofunctional monomer,
PFM: Polyfunctional monomer,
AM: Acrylamide,
NNDMA: N,N-dimethyl acrylamide,
ACMO: Acryloyl morpholine,
TBAS: Tert-butyl acrylamide sulfonic acid,
AA: Acrylic acid,
DVB: Divinyl benzene,
DEGDVE: Diethylene glycol divinyl ether,
MBA: N,N'-methylene bisacrylamide,
POPPGE: Polyoxypropylene polyglyceryl ether,
NaCl: Sodium chloride,
AH resistance: Alkali hydrolysis resistance,
IAS: Initial adhesive strength,
TCAS: Temporally changing adhesive strength,
IC: Initial current,
TCC: Temporally changing current Tables 1 and 2 show that the adhesive hydrogels of Examples 1 to 10 have better resistance to swelling and alkali hydrolysis than those of Comparative Examples 1 to 3. Specifically, the adhesive hydrogels of Examples 1 to 10 obtained from divinyl benzene or diethylene glycol divinyl ether (polyfunctional monomer) which contains no functional groups hydrolyzable under alkaline conditions, such as ester bonds and amide bonds, exhibit better resistance to alkali hydrolysis and liquefaction than the adhesive hydrogels of Comparative Examples 2 and 3 obtained from N,N'-methylene bisacrylamide (polyfunctional monomer) which contains amide bonds. The adhesive hydrogels of Examples 1 to 10 obtained from a nonionic (meth)acrylamide-based monomer (monofunctional monomer) exhibit better resistance to swelling than those of Comparative Examples 1 and 3 obtained from an anionic acrylic-based monomer (monofunctional monomer) in place of a nonionic (meth)acrylamide-based monomer.

Tables 1 and 2 show that the adhesive hydrogels of Examples 1 to 10 increase their adhesive strength for concrete with time. Specifically, the adhesive hydrogels of Examples 1 to 10 exhibit adhesive strength for concrete that increases with time over the initial adhesive strength. The temporally changing adhesive strengths (adhesive strengths after 1 week) for concrete of these adhesive hydrogels are greater than or equal to 3 N (specifically, greater than or equal to 4.7 N), which confirms that they adhere firmly to concrete. In contrast, the adhesive hydrogel of Comparative Example 3 exhibits adhesive strength for concrete that decreases with time. Since the adhesive hydrogels of Comparative Examples 1 to 3 exhibit temporally changing adhesive strength (adhesive strength after 1 week) for concrete that is greater than or equal to 3 N, they would adhere firmly to concrete. These adhesive hydrogels however have poor resistance to alkali hydrolysis and swelling, hence poor long-term (on the order of years) weatherability, and would not maintain adhesive strength for an extended period of time.

Tables 1 and 2 show that the adhesive hydrogels of Examples 1 to 10 increase their adhesive strength for a zinc plate with time in a similar manner to their adhesive strength for concrete. Specifically, the adhesive hydrogels of Examples 1 to 10 exhibit adhesive strength for zinc and other metal plates that increases with time over the initial adhesive strength. The temporally changing adhesive strengths (adhesive strengths after 2 weeks) for a zinc plate of all these adhesive hydrogels are greater than or equal to 3 N, which confirms that they adhere firmly to zinc and other metal plates. In contrast, the adhesive hydrogel of Comparative Example 3 exhibits adhesive strength for a zinc plate that decreases with time. Since the adhesive hydrogels of Comparative Examples 1 and 2 exhibit adhesive strength for a zinc plate that increases with time and temporally changing adhesive strength (adhesive strength after 2 weeks) for a zinc plate that is greater than or equal to 3 N, they would adhere firmly to a zinc plate. These adhesive hydrogels however have poor resistance to alkali hydrolysis and swelling, hence poor long-term (on the order of years) weatherability, and would not maintain adhesive strength for an extended period of time.

It is concluded from these observations that some of the adhesive hydrogels of Comparative Examples 1 to 3 exhibit adhesive strength for concrete and zinc and other metal plates that improves with time (1 to 2 weeks). All the adhesive hydrogels of Comparative Examples 1 to 3 however have poor resistance to alkali hydrolysis and swelling, hence poor weatherability in various environments (high temperature, poor weather, etc.), and would not maintain adhesive strength for an extended period of time. In contrast, all the adhesive hydrogels of Examples 1 to 10 exhibit adhesive strength for concrete and zinc and other metal plates that improves with time (1 to 2 weeks) and have excellent resistance to alkali hydrolysis and swelling, hence good weatherability in various environments (high temperature, poor weather, etc.), and would maintain adhesive strength for an extended period of time. As detailed here, it is concluded that the adhesive hydrogels of Examples 1 to 10, that is, the adhesive hydrogel in accordance with the present invention, unfailingly exhibit sufficient adhesive strength for concrete and zinc and other metal plates initially and over time and have resistance to liquefaction under alkaline conditions and excellent resistance to swelling.

Measuring Protection Current

The 0.75-mm-thick adhesive hydrogels (adhesive hydrogel sheets) prepared by adding an electrolyte to a mixed monomer solution in Examples 1 and 2 and Comparative Examples 1 and 3 were cut to 30 m (width)×30 mm (length). After that, the PET film (top film) on one of the surfaces of each adhesive hydrogel sheet was peeled. A zinc plate (30 mm (length)×40 mm (width)×0.25 mm (thickness)) was attached to the surface from which the PET film (top film) had been peeled. After peeling a PET film (base film) from the other surface, concrete (150 mm (length)×150 mm (width)×30 mm (thickness), fabricated according to JIS A 5364) with a steel plate was attached to the surface from which the PET film (base film) had been peeled, to prepare each test piece. The zinc plate of the test piece was connected to the anode side of an electrometer ("Model 6514 System Electrometer" manufactured by Keithley), and the steel plate on the concrete of the test piece was connected to the cathode side. Electric current was measured at t=0 (initial current) and after 3 weeks from the start of the measurement (temporally changing current). Tables 1 and 2 show measurements of the electric currents for the adhesive hydrogels prepared in Examples 1 and 2 and Comparative Examples 1 and 3.

The measurements of the initial current and the temporally changing current in Tables 1 and 2 show that the currents for the adhesive hydrogels of Examples 1 and 2 prepared from a nonionic (meth)acrylamide-based monomer (monofunctional monomer) are initially of the same level as, and decrease less with time than, the currents for the hydrogels of Comparative Examples 1 and 3 prepared from an anionic acrylic-based monomer (monofunctional monomer). In other words, when the adhesive hydrogel in accordance with the present invention contains an electrolyte, its current level decreases less with time. The adhesive hydrogel in accordance with the present invention, if containing an electrolyte, is useful in electrolytic protection of a concrete structure.

The present invention may be implemented in various forms without departing from its spirit and main features. Therefore, the aforementioned examples are for illustrative purposes only in every respect and should not be subjected to any restrictive interpretations. The scope of the present invention is defined only by the claims and never bound by the description. Those modifications and variations that may lead to equivalents of claimed elements are all included within the scope of the invention.

The present patent application claims priority on Japanese Patent Application, Tokugan, No. 2012-065723 flied Mar. 22, 2012 in Japan, the entire contents of which are hereby incorporated herein by reference.

INDUSTRIAL APPLICABILITY

The adhesive hydrogel in accordance with the present invention unfailingly exhibits stable adhesiveness and electrical conductivity even under alkaline conditions and is suited for use in construction, for example, as a material for a non-polarized electrode installed on the surface of the ground or bedrock in an electric geological survey, as an electrically conductive material, for example, in detection of damage of a waterproof sheet in a waste disposal site, and as an electrically conductive pressure sensitive adhesive material disposed between a concrete structure and a metal (anode) in a method for electrolytic protection of a concrete structure.

The invention claimed is:
1. An adhesive hydrogel which comprises a polymer matrix, water, and a polyhydric alcohol,
the polymer matrix containing a copolymer of a monofunctional monomer with a single polymerizable C—C double bond and a polyfunctional monomer with two or more polymerizable C—C double bonds,
the monofunctional monomer containing a nonionic (meth)acrylamide-based monomer, and
the polyfunctional monomer having a composition formula:

where O is an oxygen atom in an ether bond, l is an integer greater than or equal to 4, m is an integer greater than or equal to 6, and n is an integer greater than or equal to 0,
wherein the polyfunctional monomer is at least one compound selected from aromatic divinyl compounds,
wherein the adhesive hydrogel comprises, as the polyhydric alcohol, only at least one compound selected from the group consisting of ethylene glycol, propylene glycol, butanediol, glycerin, pentaerythritol, sorbitol, polyethylene glycol, and polypropylene glycol, and
wherein the monofunctional monomer comprises, as the nonionic (meth)acrylamide-based monomer, only at least one compound selected from the group consisting of (meth)acrylamide, N,N-dimethyl(meth)acrylamide, and dimethylaminopropyl(meth)acrylamide.

2. The adhesive hydrogel as set forth in claim 1, comprising:
15 parts by weight to 50 parts by weight of structural units derived from the nonionic (meth)acrylamide-based monomer per 100 parts by weight of the adhesive hydrogel; and
0.01 parts by weight to 0.5 parts by weight of structural units derived from the polyfunctional monomer per 100 parts by weight of the adhesive hydrogel.

3. The adhesive hydrogel as set forth in claim 2, comprising:
20 parts by weight to 70 parts by weight of the polyhydric alcohol per 100 parts by weight of the adhesive hydrogel; and
10 parts by weight to 60 parts by weight of water per 100 parts by weight of the adhesive hydrogel.

4. The adhesive hydrogel as set forth in claim 1, wherein the polyfunctional monomer is at least one compound selected from the group consisting of divinyl benzene and divinyl biphenyl.

5. The adhesive hydrogel as set forth in claim 1, exhibiting an adhesive strength for concrete, the force increasing with time over an initial adhesive strength.

6. The adhesive hydrogel as set forth in claim 1, exhibiting an adhesive strength for a metal, the force increasing with time over an initial adhesive strength.

7. The adhesive hydrogel as set forth in claim 1, being shaped like a sheet with a thickness of 0.1 mm to 10 mm.

8. The adhesive hydrogel as set forth in claim 1, further comprising 0.05 parts by weight to 10 parts by weight of an electrolyte per 100 parts by weight of the adhesive hydrogel so that the adhesive hydrogel is electrically conductive.

9. A method for electrolytic protection of a concrete structure, which comprises the step of passing a protection current between an anode disposed on a surface of the concrete structure via the adhesive hydrogel as set forth in claim 8 and a steel material that acts as a cathode inside the concrete structure.

* * * * *